Dec. 1, 1953    O. H. MILMORE    2,660,886
PNEUMATIC SPEED SENSING UNIT

Filed April 17, 1951    2 Sheets-Sheet 1

Inventor:
Oswald H. Milmore

Inventor:
Oswald H. Milmore

Patented Dec. 1, 1953

2,660,886

UNITED STATES PATENT OFFICE 2,660,886

PNEUMATIC SPEED SENSING UNIT

Oswald H. Milmore, Berkeley, Calif., assignor to Shell Development Company, Emeryville, Calif., a corporation of Delaware Application April 17, 1951, Serial No. 221,375

4 Claims. (Cl. 73—136)

This invention relates to methods and apparatus for indicating, recording or controlling the speed of rotating elements or machinery, and pertains more particularly to an improved system wherein a pressure difference proportional to the speed of a rotating element is developed within a fluid, said pressure difference being applied, directly or indirectly, to indicate, record or control said speed.

It is an object of this invention to provide a highly sensitive method and apparatus for measuring and controlling rotational speed, wherein speed variations are translated into variations of fluid pressure.

It is also an object of this invention to provide a method and an apparatus whereby a pressure is developed in a fluid which is linearly proportional to the observed or measured speed.

It is also an object of this invention to provide a system capable of yielding a pressure or pressure difference proportional to the product of the measured speed value and of a multiplier quantity, such as the output of a second sensing or measuring device, which output may be variable, thus causing the second sensing device to act as a modulator. For example, if the output of such modulator device is proportional to the load on the shaft whose speed is being measured, the product obtained will be proportional to the power transmitted by said shaft.

These and other objects of this invention will be understood from the following description taken with reference to the attached drawings, wherein.

The system of the present invention comprises three main elements. First, a source for supplying a fluid which may be a gas or a liquid supplied at a controlled rate, such as a uniform or a modulated rate, and preferably at a constant mass rate. Second, a speed sensing element proper, comprising a rotor driven by a shaft or other rotating element whose speed is to be sensed, said rotor being mounted in a properly shaped housing concentrically therewith, the inner diameter of the housing being somewhat larger than the diameter of the rotor. The housing is provided with fluid inlet and outlet port means on diametrically opposite sides of the rotor, said port means being in communication with the above fluid source. The housing has also a pair of pressure port means disposed symmetrically with regard to the fluid flow on opposite sides of the rotor and with regard to the inlet and outlet port means. Third, a pressure-differential responsive element connected to the pressure ports of the housing and adapted to modify a signal in a control line, in order, for example, to control the output pressure in a control circuit as a function of the pressure difference at the pressure ports of the housing. The first and the third elements may be of any desired type, suitable structures therefor being known in the art and commercially available.

The present system has the advantage over speed-sensing or governor systems of conventional types, such as the fly-ball governor, of yielding a pressure difference which is linearly proportional to rotational speed and which can be readily converted into a signal which is also linearly proportional to speed. A further advantage lies in the elimination of the relatively complicated mechanism of fly-ball systems and in the elimination of mechanical friction or wear on the elements that determine the pressure difference. Another advantage of the present system resides in the ease with which sensed speed values can be modulated or multiplied by a constant or variable output of a modulator or multiplier device.

Figure 1:
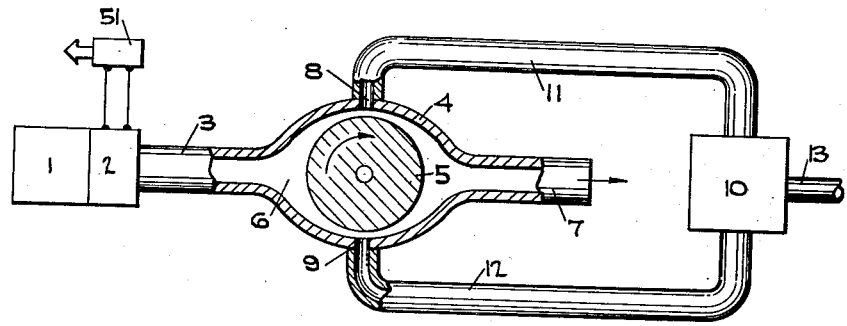
Fig. 1 is a simplified diagram showing the arrangement of the essential components of the present system.

Referring to the drawings, Fig. 1 diagrammatically illustrates the arrangement of elements outlined above. A source 1 delivers, through a metering device or control valve 2 and a conduit 3, a pressure fluid at a constant or controlled rate to a unit 4. The source 1 may be a pressure reservoir, a compressor, etc., and the pressure fluid may be a compressed gas or air, or any suitable hydraulic liquid. For simplicity, the invention will be described hereinbelow with regard to the use of compressed air. The system may operate with either a constant fluid volume flow, or with a constant fluid mass flow. However, since the operation of the system is based theoretically on a differential pressure which varies linearly with the rate of fluid mass flow, it is preferred to use a meter or controller 2 which passes air at a constant mass rate, particularly when the temperature and therefore the density of the air may be subject to significant variations.

Figure 2:
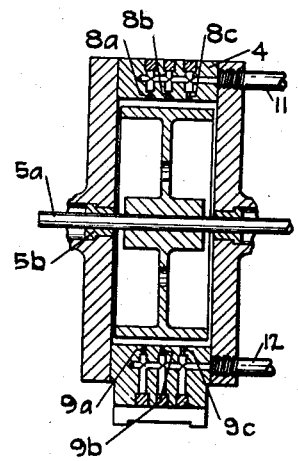
Fig. 2 is a cross-section view of the speed sensing unit 4 taken at right angles to that shown in Fig. 1.

The unit 4 comprises housing and a rotor 5 either driven directly by a rotating element such as a shaft whose speed is to be sensed, or geared or otherwise coupled to said shaft to rotate at a speed which is linearly proportional to the shaft speed. The rotor 5 is a body having a circular cross-section in a plane perpendicular to its axis of rotation and the peripheral surface thereof is preferably cylindrical in shape. It may be driven by a shaft 5a extending through a packed running seal 5b to prevent leakage of the fluid, as shown in Fig. 2. The rotor 5 is rotatably mounted within the bore 6 of the unit or housing 4, said bore having a diameter slightly larger than that of rotor 5 and having a generally cylindrical form. The bore 6 is connected at diametrically opposite points to the inlet conduit 3 and discharge conduit 7, and the interior wall of the housing is streamlined at these points as shown. The bore 6 is symmetrical about the axis of conduits 3 and 7 and the rotor axis intersects that axis so as to insure equal flow of air on opposite sides of the rotor. One or more pressure ports 8 or 9, open to the bore 6, are provided on each side of the rotor, at points symmetrically offset, preferably by 90°, with regard to the axis of conduits 3 and 7, i. e., diametrically opposite to each other. The pressure ports 8 and 9 are connected by conduits 11 and 12, respectively, to the differential pressure responsive unit 10. When a plurality of pressure ports 8a, 8b, 8c and 9a, 9b and 9c, are used they may be manifolded to connect the corresponding groups to the conduits 11 and 12, respectively, as shown in Fig. 2. The actual constants and dimensions of the unit 4 and its elements vary according to the nature and size of the installation. In general, rotor speeds from 500 R. P. M. may be used. The gap around the rotor is substantially annular in shape, widening towards the points at which pipes 3 and 7 are connected thereto. In general, the width of the gap at the most narrow point is of the order of about 7 per cent of the rotor diameter, which may have a value such as from 2 to 5 inches.

The unit 10 may be of any desired electrical, mechanical or fluid pressure type which will produce a signal proportional to the pressure differential applied thereto. For example, the element 10 may be made to vary the pressure of a fluid in a control line 13 as a function of the difference of pressures in the conduits 11 and 12. Thus, as will be described in detail with regard to the embodiment illustrated in Fig. 4, use can be made of a pilot valve actuated by a diaphragm or a pair of bellows subjected to the pressures in conduits 11 and 12 for admitting air to or venting air from line 13, which line is in turn connected to a suitable pressure-responsive control instrument, such as a valve which regulates the flow of fuel to a prime mover driving the shaft, or a speed controller which is also acted upon by some further process variable, such as a pump suction pressure, and which in turn controls said fuel regulating valve.

When the rotor 5 is stationary, the rates of fluid flow from conduit 3 past the ports 8 and 9 are equal; when the rotor rotates (for example, in a clockwise direction as shown in Fig. 1) there is induced, in the gap between the rotor and the housing bore, a circumferential flow of fluid entrained by the rotor. This induced flow rate is added to the basic flow rate at the port 8, and subtracted therefrom at the port 9, the flow rates past ports 8 and 9, being thus different by an amount which is a function of the dimensions of the apparatus used and of the speed of rotor 5. In accordance with the law of Bernouilli, there is therefore between ports 8 and 9 a pressure difference which is proportional to the speed of the rotor and to the mass rate of air flow through conduits 3 and 7. If the unit 10 is linear in response, the pressure in the control line 13 will also be linearly proportional in direct or inverse ratio, as desired, to the speed of the rotor 5 and hence to the shaft speed. The element 10 may be of the type that varies the pressure in line 13 continuously throughout the range of speed variations, or may incorporate, in a manner well known in the art, a "range suppression" feature, whereby the pressure in line 13 is held at zero or at some constant value, or is varied only slightly throughout a predetermined range, which may have a low or a high value, until a predetermined pressure differential is reached between conduits 11 and 12, whereupon the pressure in conduit 13 is increased or decreased at a rate which is proportional to changes in the pressure difference between ports 8 and 9, as will be likewise described hereinbelow with regard to Fig. 4.

For greatest accuracy, it is preferred to construct and operate the unit 10 on the force balance principle, that is, in such manner that the pressure in line 13 is physically balanced, through suitable pressure responsive elements, against the pressures in the conduits 11 and 12, as also will appear hereinbelow.

Figure 3:
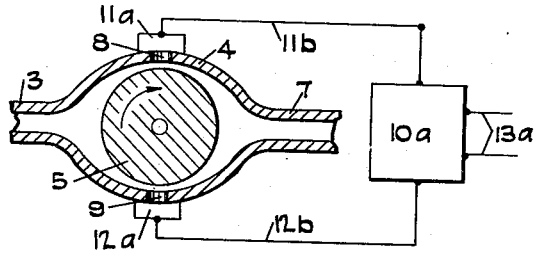
Fig. 3 shows a slight modification of the system of Fig. 1.

The system shown in Fig. 3 is similar to that of Fig. 1 and differs in that the pressure ports 8 and 9, instead of opening to a pressure-responsive unit 10 through conduits 11 and 12, respectively, are in communication with pressure-responsive elements 11a and 12a, such for example as piezoelectric elements, strain gages, etc., capable of translating pressures into electric impulses. These impulses are transmitted through electrical conductors 11b and 12b to the unit 10a, which indicates or records said impulses and/or applies them to control the speed of the proper rotatable element, either pneumatically, as in Figs. 1 and 4, or electrically through electrical conductors 13a, as shown in Fig. 3.

Figure 4:
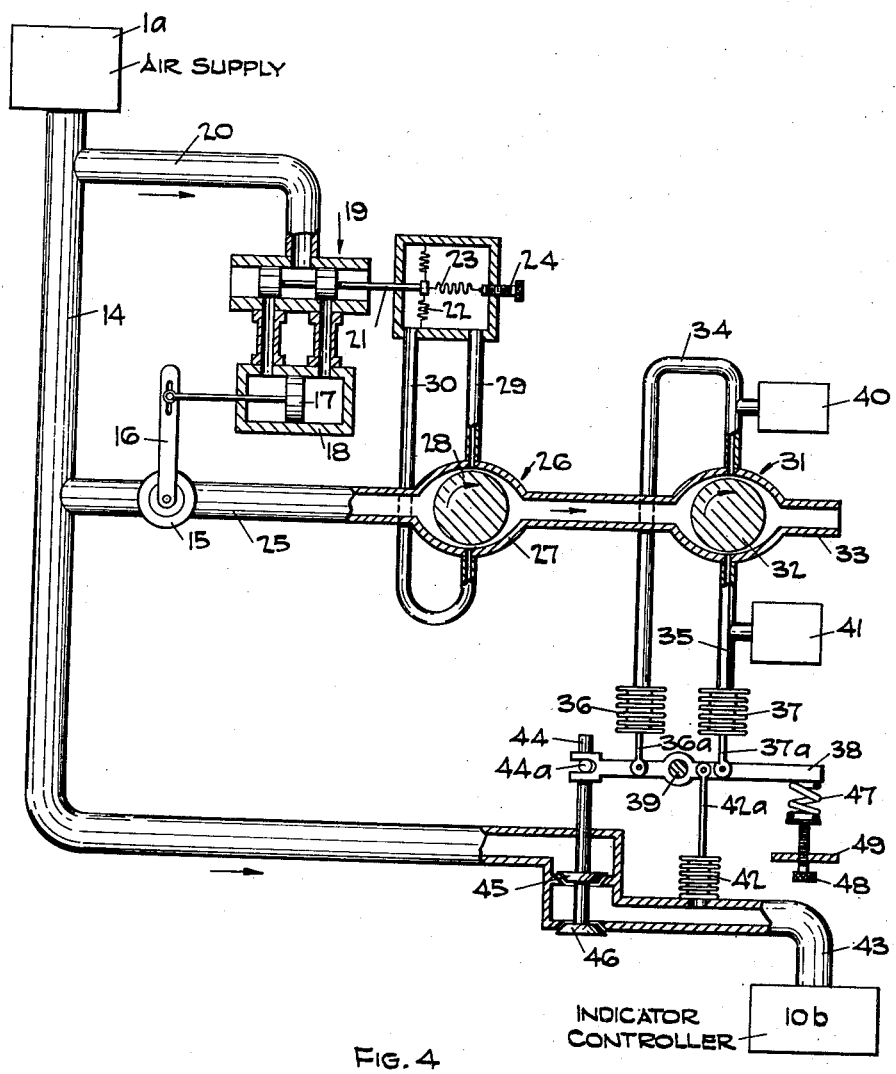
Fig. 4 is a diagram showing a system similar to that of Fig. 1 in greater detail.

A specific embodiment following in general the system of Fig. 1 is shown in detail in Fig. 4, where a pipe 14 is connected to a regulated air supply 1a. The air stream for the speed sensing unit is metered by a flow control valve 15 having a control arm 16 operated by a piston 17 reciprocating in a cylinder 18. The two ends of cylinder 18 may be selectively vented or connected to pressure air by means of a pilot valve 19. This valve is connected by a conduit 20 to the pipe 14 and comprises a pair of slide valves mounted on a common rod 21, shown in the drawing in its neutral position. The control rod is adapted to be shifted either to the right or to the left by means of a diaphragm 22, which is biased by a spring 23, the tension whereof may be adjusted by a threaded control screw 24.

Air from the control valve 15 flows through conduit 25 to a mass flow meter 26 constructed like the speed sensing unit 4 of Fig. 1, and having a housing 27 and a rotor 28. The pressure ports at the opposite sides of the housing are connected respectively to opposite sides of the diaphragm 22 by conduits 29 and 30. Rotor 28 is driven at a constant speed by means of a prime-mover such, for example, as an electric synchronous motor, not shown in Fig. 4, but similar to motor 53 of Fig. 5. The difference between the pressures acting on the opposite sides of the diaphragm 22 is, therefore, proportional to the mass flow of the air in conduit 25, and the diaphragm will assume the neutral position shown in Fig. 4 at a pressure differential determined by the tension of the spring 23. Should the mass flow rate increase, due, for example, to an increase in the pressure of the air at its source or to a drop in temperature the diaphragm 22 will shift the pilot valve 19 to the right to actuate the piston 17 towards the left, thereby urging valve 15 towards the closed position. Conversely, a decrease in the mass flow rate will produce a sequence of effects in the opposite direction. The predetermined rate of air flow may be selected by adjustment of the screw 24 and/or by changing the speed of the rotor 28.

Air from the meter 26 flows through the speed sensing unit 31, corresponding to unit 4 of Fig. 1, the rotor of which is connected or coupled to the shaft whose speed is to be measured and/or controlled, and is thereafter vented through the outlet 33. The pressure ports of the element 31 are connected by conduits 34 and 35 to diaphragms or bellows 36 and 37, respectively, which are linked by pivoted push rods 36a and 37a to an operating lever 38, rotatable about a fixed journal 39. Pulsation dampening devices, such as vessels 40 and 41 may be connected, if desired, to the conduits 34 and 35, respectively, in order to filter out pulsations of relatively high frequency, such an arrangement being desirable when the rotor 32 is subject to pulsating motion, for example, when the shaft connected to the rotor is driven by an internal combustion engine.

A difference between the pressure within the bellows 36 and 37 tends to rotate the lever 38 about the journal 39. This torque is balanced by a bellows 42 connected to the lever 38 by a pushrod 42a. The bellows 42 is open to the control pressure in a control output conduit 43 connected to a speed controlling and/or indicating or recording unit 10b.

The air pressure in conduit 43 required to maintain lever arm 38 in equilibrium against any given pressure difference between bellows 36 and 37 will depend on the dimensional constants of the bellows and lever arm mechanism. The lever may be bifurcated at one end to engage a pin 44a of a valve rod 44 on which a double pilot valve 45—46 is fixed so that valve 45 is seated when valve 46 is fully open and vice versa. Valve 45 controls the admission of air from any source of air, preferably one at a regulated pressure such as the pipe 14, to conduit 43, while valve 46 vents air from conduit 43 to the atmosphere.

In operation, if the speed of the rotor 32, rotating in a clockwise direction as shown, is increased, the pressure differential between bellows 37 and 36 is increased proportionally thereby increasing the torque acting on lever 38 and rocking the lever clockwise and moving valve 45 towards the open position and valve 46 towards the closed position. This admits air at higher pressure to the conduit 43 at an increased rate and reduces the rate of efflux of air through the valve 46, thereby effecting a rise of pressure in conduit 43 and bellows 42, tending to balance the increase in the torque on the lever 38. A decrease in rotor speed similarly causes a counter-clockwise rotation of the lever and a further opening of the valve 46, whereby more air is vented and the pressure in conduit 43 and bellows 42 is reduced. The output pressure delivered to the speed indicator or controller 10b is thus at all times directly proportional to the speed of the rotor. It is evident that this system employs the force balance principle, in that the output pressure in the conduit 43 is balanced against the pressure difference in the conduits 34 and 35.

To enable the unit 10b to operate at full-scale deflection within a narrow desired range of speeds only and to suppress the undesirable ranges, such as low speed and pressure ranges, a spring 47 may be provided, if desired, to bias the lever 38. The spring 47 is adjustably tensioned by a screw 48 threaded in a fixed abutment 49. From zero rotor speed up to a speed determined by the adjusted force of spring 47, the spring-biased lever 38 will hold valve 45 seated. For rotor speeds above that at which the pressure difference between the bellows 36 and 37 just balances the force exerted by the spring 47, the system will operate in the manner described above, the critical pressure being:

$$P = Kv - C$$

wherein P is the output pressure in control circuit 43, v is the rotor or speed shaft, K is the dimensional system constant, and C is the spring constant as determined in each case by the setting of the adjusting screw. The spring 47 should preferably be relatively long, so that a substantially constant force may be applied to the lever throughout the arc of rotation of the latter.

The present system is especially advantageous in permitting to utilize a variable or "modulated" flow instead of a constant flow in conduits 3 or 25 of Figs. 1 or 4, respectively. Thus the mass flow of air from source 1a may be further controlled as a function of another desirable variable. For example, the mass flow of air from unit 1 in Fig. 1 may be subject to control by an instrument such for example as a manometer, thermocouple, etc., shown at 51, whose output is electrically applied to the metering device 2 to vary or modulate air mass flow to pipe 3 to be proportional to a measured variable. It will be obvious that in such case the output pressure difference delivered to the indicator, recorder or controller 10 will be a linear function of the product of the speed of the rotor 5 and of the second variable measured by the element 51.

Figure 5:
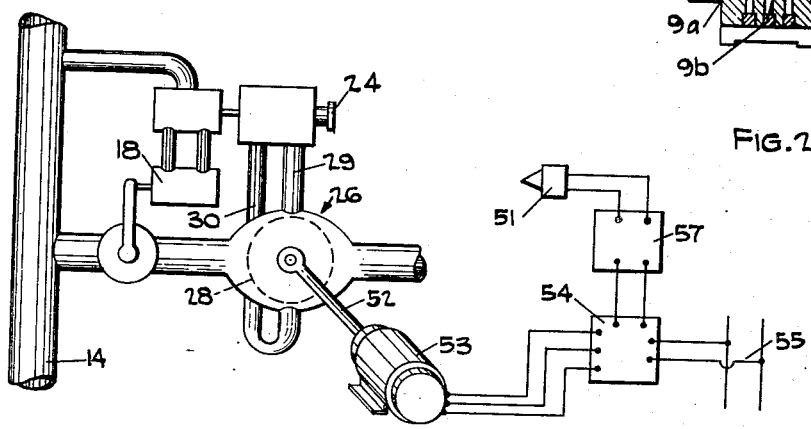
Fig. 5 illustrates a modification in a part of the system of Fig. 4.

A further development of the system of Fig. 4 is shown in Fig. 5. The rotor 28 in housing 26 is driven at a regulated variable speed through drive shaft 52 by a variable speed electric motor 53, electrically connected and responsive to a speed control unit 54 to which power is supplied from a main 55. Unit 54 varies the field strength or otherwise regulates the speed of the motor in accordance with signals received from a controller 57, which may be responsive to a force measuring device, a manometer, thermocouple, etc., as diagrammatically shown at 51.

It is evident that the pressure difference between the conduits 29 and 30 is directly proportional to the product of the mass flow rate of air and the speed of the shaft 52; hence, with the adjustment 24 set for a given pressure difference, the mass flow rate will be inversely proportional to the speed of the shaft 52. Hence the pressure difference developed between the conduits 34 and 35 is linearly proportional to the product of the speed of the rotor 32 and the reciprocal of the speed of the shaft 52 and rotor 28, and the system is capable of effecting multiplication. Considered from a different aspect, the pressure difference between conduits 34 and 35 is proportional to the quotient of the speed of rotor 32 divided by the speed of the rotor 28.

As an example, the unit 54 may be of the type that regulates the speed of the motor 53 to be inversely proportional to the variable measured by element 51, referred to hereinabove as the multiplier quantity. The rate of mass air flow passing the unit 26 will therefore be maintained by valve 15 at a value directly proportional to the magnitude of the measured variable (multiplier quantity). Hence, the difference between the pressures in the bellows 36 and 37 is directly proportional to the product of the speed of the rotor 32 and the multiplier quantity.

I claim as my invention:

1. A method of obtaining an indication proportional to the product of rotational speed and of a multiplier quantity, comprising the steps of rotating a body of circular cross-section at a speed proportional to that to be measured, measuring a condition independent of said speed to obtain a multiplier quantity, flowing a fluid at a controlled rate proportional to said multiplier quantity in a direction perpendicular to the axis of rotation of said body through a gap space around said body, thereby developing a pressure difference between two points in said gap, said points lying on opposite sides of said body substantially along a diametrical line passing through said body at right angles to the direction of fluid flow, said pressure difference being proportional to the product of the speed to be measured and of said multiplier quantity, and indicating said pressure difference.

2. An apparatus for obtaining an indication proportional to the product of the speed of a rotating element and of a multiplier quantity, said apparatus comprising means for measuring a condition independent of said speed to obtain a multiplier quantity, a rotor rotating at a speed fixedly related to that of said element, a housing enclosing said rotor to form a substantially annular gap between said rotor and the inner walls of said housing, means for passing a fluid flow through said housing in a direction perpendicular to the axis of rotation of said rotor at a rate proportional to said multiplier quantity, said fluid flowing through said annular gap on both sides of the rotor, means for sensing the fluid pressure in said gap at two points lying on opposite sides of said rotor substantially along a diameter thereof perpendicular to the line of flow of the fluid impinging on said rotor, and means for comparing the pressures sensed at said two points.

3. Apparatus for sensing the speed of a rotating element, said apparatus comprising a first rotor rotating at a constant speed, a second rotor rotating at a speed fixedly related to that of said rotating element, a housing enclosing each of said rotors to form a substantially annular gap therearound, a source of pressure fluid, conduit means connecting said two housings in series to said source to pass a controlled fluid flow therethrough in a direction perpendicular to the axis of rotation of each of said rotors, said fluid flowing through the annular gaps on both sides of each of the rotors, means for sensing the fluid pressure in the gap around the first rotor at two points lying on opposite sides of said rotor substantially along a diameter thereof perpendicular to the line of the flow impinging on said rotor, means for applying the sensed pressures in opposition to each other, metering means responsive to the differential pressure thus obtained for controlling the rate of flow through said conduit means, means for sensing the fluid pressure in the gap around the second rotor at two points lying on opposite sides of said rotor substantially along a diameter thereof perpendicular to the line of the flow impinging on said rotor, and means for comparing the pressure sensed at said two points.

4. An apparatus for obtaining an indication proportional to the product of the speed of a rotating element and of a multiplier quantity, said apparatus comprising means for sensing a condition independent of said speed to obtain said multiplier quantity, a first rotor, means responsive to said sensing means for varying the speed of said rotor inversely proportionally to said multiplier quantity, a second rotor rotating at a speed fixedly related to that of said rotating element, a housing enclosing each of said rotors to form a substantially annular gap therearound, a source of pressure fluid, conduit means connecting said two housings in series to said source to pass a controlled fluid flow therethrough in a direction perpendicular to that of the axis of rotation of each of said rotors, said fluid flowing through the annular gaps on both sides of each of said rotors, means for sensing the fluid pressure in the gap around the first rotor at two points lying on opposite sides of said rotor substantially along a diameter thereof perpendicular to the line of the flow impinging on said rotor, means for applying the sensed pressures in opposition to each other, metering means responsive to the differential pressure thus obtained for controlling the rate of flow through said conduit means, means for sensing the fluid pressure in the gap around the second rotor at two points lying on opposite sides of said rotor substantially along a diameter thereof perpendicular to the line of the flow impinging on said rotor, and means for comparing the pressures sensed at said two points.

OSWALD H. MILMORE.

References Cited in the file of this patent

UNITED STATES PATENTS

| Number | Name | Date |
|---|---|---|
| 1,604,672 | Albersheim et al. | Oct. 26, 1926 |
| 2,078,837 | Carter | Apr. 27, 1937 |
| 2,454,565 | Peterson | Nov. 23, 1948 |

OTHER REFERENCES

Publication by Van Vugt entitled "Method for measuring the mass flow of gases or liquids in closed-duct system" in Engineer's Digest, vol. 11, No. 5, May 1950, pages 177–180 and 190.

Publication by Brand and Ginsel entitled "The mass flow meter a method for measuring pulsating flow" appearing in Instruments, vol. 24, March 1951, pages 331–335.